(12) United States Patent
Lowe et al.

(10) Patent No.: US 8,462,276 B2
(45) Date of Patent: Jun. 11, 2013

(54) SYSTEM, METHOD AND APPARATUS FOR ILLUMINATING A BEZEL

(75) Inventors: Kenneth Roy Lowe, San Juan Capistrano, CA (US); Matthew Blake McRae, Laguna Beach, CA (US); John Schindler, Ladera Ranch, CA (US)

(73) Assignee: Vizio Inc., Irvine, CA (US)

( * ) Notice: Subject to any disclaimer, the term of this patent is extended or adjusted under 35 U.S.C. 154(b) by 988 days.

(21) Appl. No.: 12/509,897

(22) Filed: Jul. 27, 2009

(65) Prior Publication Data

US 2011/0018462 A1    Jan. 27, 2011

(51) Int. Cl.
*H04N 9/30* (2006.01)
*G06F 3/038* (2006.01)

(52) U.S. Cl.
USPC ............................................ 348/802; 345/204

(58) Field of Classification Search
USPC ............... 315/169.3, 291, 307, 312; 348/739, 348/790, 794, 798, 799, 800, 801–803; 345/204–206, 45–46, 48, 50
See application file for complete search history.

(56) References Cited

U.S. PATENT DOCUMENTS

| | | | | |
|---|---|---|---|---|
| 5,162,783 | A * | 11/1992 | Moreno | 345/175 |
| 6,556,222 | B1 * | 4/2003 | Narayanaswami | 715/786 |
| 7,264,373 | B2 * | 9/2007 | Huang et al. | 362/219 |
| 8,154,523 | B2 * | 4/2012 | Miller et al. | 345/173 |
| 2002/0118177 | A1 * | 8/2002 | Newton | 345/173 |
| 2009/0289874 | A1 * | 11/2009 | Ha | 345/1.3 |

* cited by examiner

*Primary Examiner* — Minh D A
(74) *Attorney, Agent, or Firm* — Law Office of Scott C. Harris, Inc.

(57) ABSTRACT

An application for a bezel with internal lighting includes at least one illuminated element situated behind a monitor/television bezel. The brightness and color of the illuminating elements and hence the bezel appearance are modified based upon either user preference or an internal or external parameters such as time, content being viewed, recording status, etc.

16 Claims, 10 Drawing Sheets

SYSTEM, METHOD AND APPARATUS FOR ILLUMINATING A BEZEL

CROSS-REFERENCE TO RELATED APPLICATION

This application is related to U.S. application Ser. No. 12/509,920 titled, "SYSTEM, METHOD AND APPARATUS FOR IMBEDDING A DISPLAY IN A BEZEL," which was filed on even date herewith; and inventors Kenneth Lowe, Matthew Blake McRae and John Schindler.

FIELD OF THE INVENTION

This invention relates to the field of display devices and more particularly to a system for illuminating the bezel of a display device.

BACKGROUND OF THE INVENTION

Monitor/television devices such as LCD or Plasma televisions have a bezel surrounding the actual display device (LCD panel, Plasma panel, CRT, etc). There have been many colors and varieties of bezels. Most bezels on current monitor/television products are black, while bezels on notebook computers and monitors are often colored to match the color of the shell of the notebook computer or monitor, sometimes white, black, dark blue, etc.

There are many reasons for different bezel appearances. Some bezels reflect a trade dress of the manufacturer of the monitor/television, often having an embossed logo. Some bezels include a lighted word, usually the manufacturer's name such as, "Vizio." Some bezels are colored to coordinate, or at least, not clash with their environment. For this reason, many current television manufacturers select a black color for their bezels, since black goes with many different environments.

Another reason for different colored bezels is to reduce distraction away from the viewed picture, movie, text, etc. In some cases, a strongly contrasting bezel may lead to eye strain. This contrast issue is difficult to address with a fixed-color bezel, since it is difficult to predict what will be displayed in the display area of the monitor/television. For example, a light-colored bezel would blend well with text displayed on a white page but would not blend well with a movie, especially during scenes that are dark. Likewise, a dark or black colored bezel would blend well with the movie but would be distracting when viewing, for example, text on a white page.

One solution is to provide a monitor or television with interchangeable bezels so that the end user is able to select a bezel from a limited set of colors such as black, white and silver. This helps blend the bezel with the environment, for example when the monitor/television is used in a modern-styled home with predominately white colors, the standard black bezel can be exchanged or covered with a white bezel. This solution does not provide for varying the bezel color/appearance with respect to variations of the displayed subject matter, does not provide indications of internal metadata or status and does not solve the problem of a varying environment such as daytime vs. nighttime viewing. Furthermore, this solution is limited to a small set of bezel colors.

What is needed is a bezel that changes color based upon user control and/or internal or external data to match the environment and/or displayed content and/or information.

SUMMARY

The present invention includes a bezel with internal lighting such that, the brightness and color of the bezel are modified based upon either user preference, external parameters (e.g., Internet data, data from other devices in the home, etc.) or internal parameters (e.g., time, content being viewed, etc.).

In one embodiment, a bezel lighting system is disclosed. The bezel lighting system is mounted on a monitor/television and includes a bezel mounted on a periphery of a face of the monitor/television. The bezel surrounds a display panel and is made of a material capable of transmitting light from within the bezel to outside of the bezel. There is at least one illuminating element situated behind the bezel such that when any of the illuminating elements are energized to emit light, at least some of the light passes through the bezel.

In another embodiment, a method of controlling a bezel lighting system is disclosed including providing the bezel lighting system mounted on a monitor/television. The bezel lighting system includes a bezel mounted on a periphery of a face of the monitor/television surrounding a display panel and made of a material capable of transmitting light from within the bezel to outside of the bezel. At least one illuminating element is situated behind the bezel such that when any of the at least one illuminating elements is energized to emit light, at least some of the light passes through the bezel. A processing element is interfaced to each of the at least one illuminating element. The processing element displays an on-screen display responsive to an input device (e.g., a remote control 111). A bezel lighting option is selected from the on-screen display by a user and responsive to the bezel lighting option, the processing element controls the brightness of each illuminating element the processing element takes off the on-screen display.

In another embodiment, an illuminated bezel is disclosed. The illuminated bezel is mounted on a periphery of a face of a monitor/television and the illuminated bezel is made of a material capable of transmitting light from within the illuminated bezel to outside of the bezel. There is at least one illuminating element situated behind the illuminated bezel. Each of the illuminating elements are situated such that when any of the illuminating elements are energized to emit light, at least some of the light passes through the illuminated bezel.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
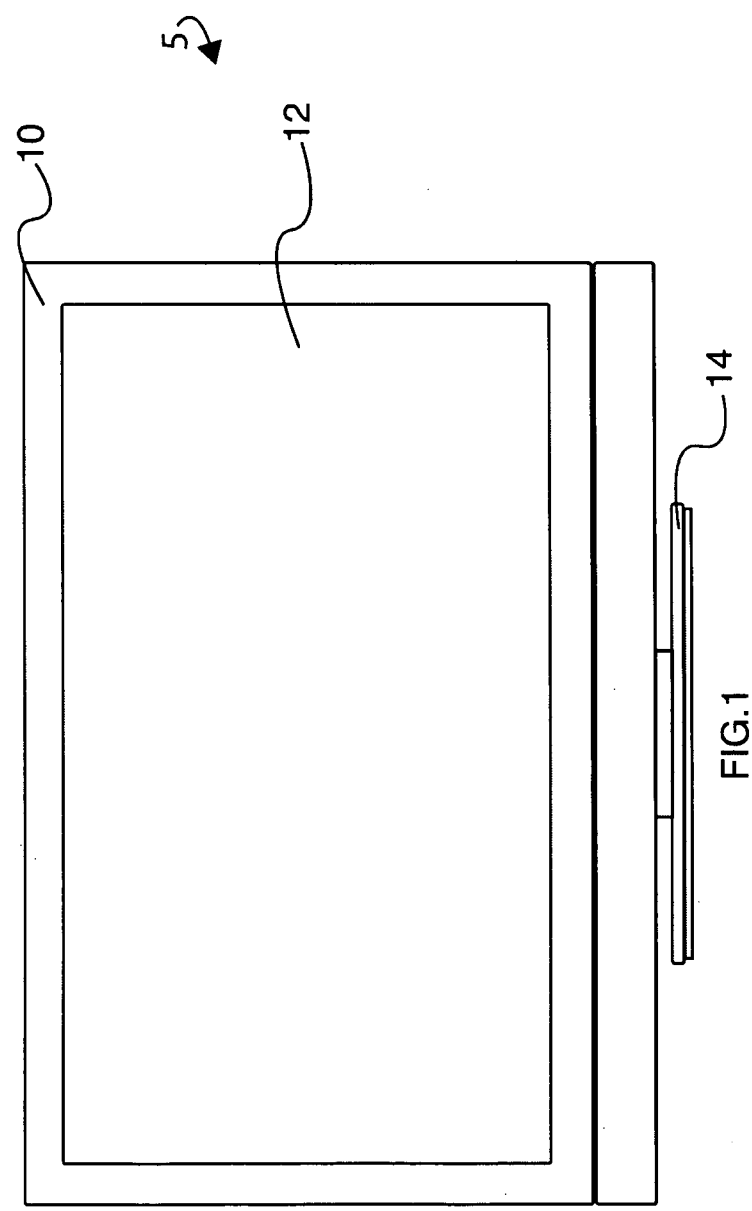
FIG. 1 illustrates a plan view of a monitor/television with bezel of the present invention.

Reference will now be made in detail to the presently preferred embodiments of the invention, examples of which are illustrated in the accompanying drawings. Throughout the following detailed description, the same reference numerals refer to the same elements in all figures. The bezel of the present invention is the facing surface surrounding an image producing surface such as an LCD panel, CRT, Plasma panel, OLED panel and the like.

Referring to FIG. 1, a plan view of a monitor/television 5 with bezel 10 of the present invention will be described. The present invention is applicable to any display device that has a bezel such as a monitor/television 5. Typically, the bezel 10 is situated around the peripheral edge of the display panel 12, covering the frame and electronics 13 (see FIG. 4) of the display panel 12. For completeness, though not required in the present invention, the monitor/television is shown on a stand 14. In this view, the bezel 10 is of a first color.

Figure 2:
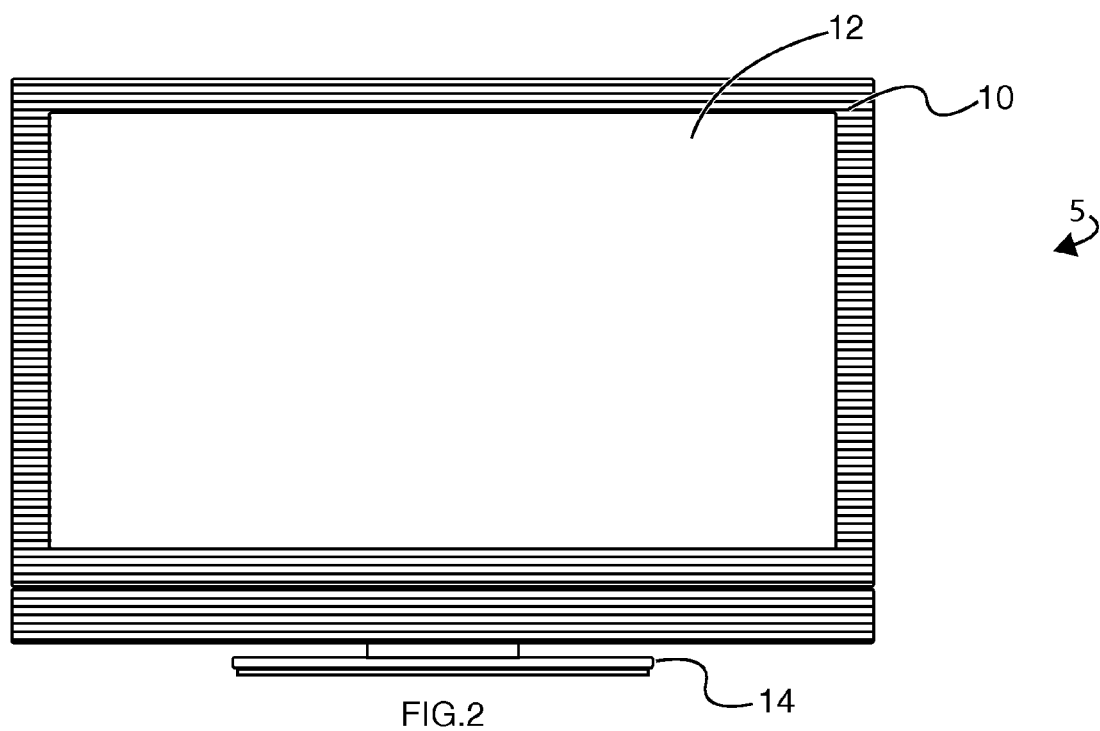
FIG. 2 illustrates a second plan view of a monitor/television with bezel of the present invention.

Referring to FIG. 2, a second plan view of a monitor/television 5 with bezel 10 of the present invention will be described. The present invention is applicable to any display device that has a bezel such as a monitor/television 5. Typically, the bezel 10 is situated around the peripheral edge of the display panel 12, covering the frame and electronics 13 (see FIG. 4) of the display panel 12. Again, for completeness, though not required in the present invention, the monitor/television is shown on a stand 14. In this view, the bezel 10 is of a second color.

Figure 3:
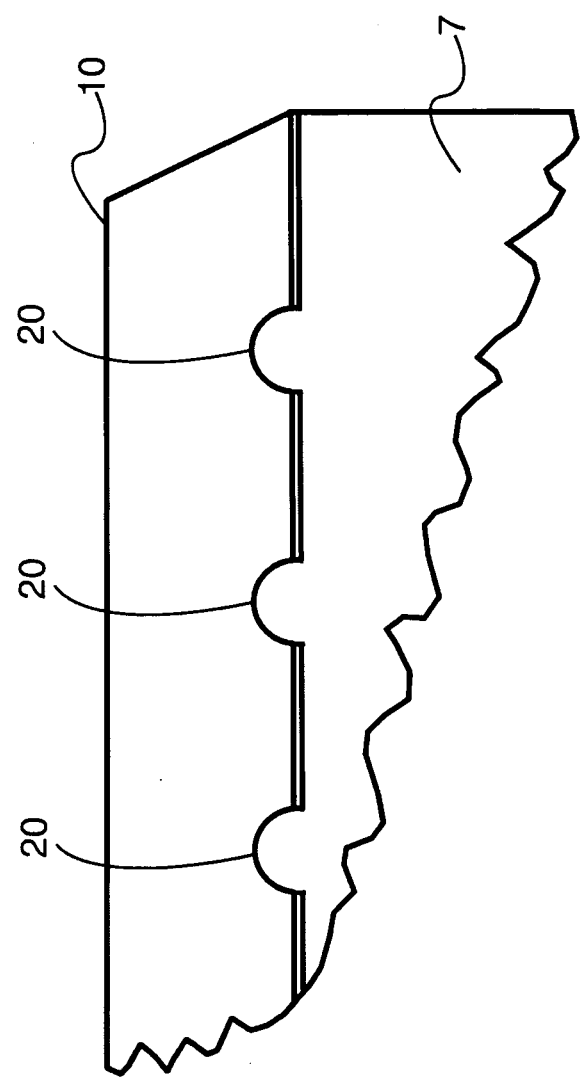
FIG. 3 illustrates a cross-sectional view lengthwise of a typical bezel of the present invention.

Referring to FIG. 3, a cross-sectional view lengthwise of a typical bezel 10 of the present invention will be described. In this view, the top edge of the bezel 10 is visible as well as a surface 7 of the back housing of the monitor/display. Beneath or within the bezel 10 are one or more illuminating elements 20. Such illuminating elements 20 are known in the art and include devices such as light emitting diodes (LEDs), incandescent lamps, fluorescent lamps, OLEDs, etc. It is also known in the art how to arrange and filter such illuminating elements 20 such that by varying the intensity of individual illuminating elements 20, multiple blended colors are achieved. For example, the illuminating elements 20 are red, green and blue LEDs or incandescent lamps with red, green or blue coatings. Such illuminating elements 20 are arranged in alteration such that when illuminated, their light mixes to create a mixed color output. Therefore, by illuminating one single illuminating element 20 (e.g., the red LED), the bezel color becomes that of the illuminated LED (e.g., red). By illuminating two illuminating elements 20 (e.g., the red LED and the blue LED), the bezel color becomes that of the illuminated LEDs combined (e.g., red and blue mixed become purple). Preferably, the surface of the bezel 10 is made of a translucent material or is made of a clear material and a diffuser layer covers the illuminating elements 20 to soften the light produced and better mix the colors. The LEDS, in some embodiments are single color LEDS and in other embodiments multiple color LEDS (e.g., red and green emitters in the same LED package).

Figure 4:
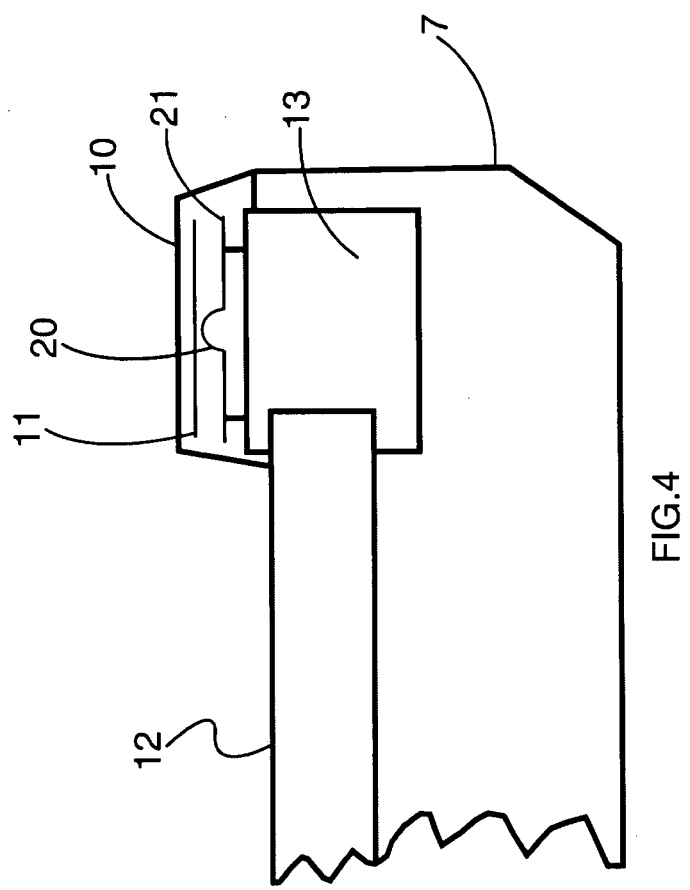
FIG. 4 illustrates a cross-sectional view side-wise of a typical bezel of the present invention.

Referring to FIG. 4, a cross-sectional view side-wise of a typical bezel of the present invention will be described. In this view, the top edge of the bezel 10 is visible as well as a surface 7 of the back housing of the monitor/display. In current practice, the bezel covers the display panel frame 13 and as little of the active display area of the display panel 12 as possible. Beneath or within the bezel 10 are one or more illuminating elements 20. Such illuminating elements are known in the art and include devices such as light emitting diodes (LEDs), incandescent lamps, fluorescent lamps, OLEDs, etc. In this view, a diffuser 11 is present in between the illuminating elements 20 and the outer surface of the bezel 10. The diffuser softens and mixes the light from the individual illuminating LEDs. In some embodiments, the illuminating elements 20 are mounted on a circuit board 21.

Figure 5:
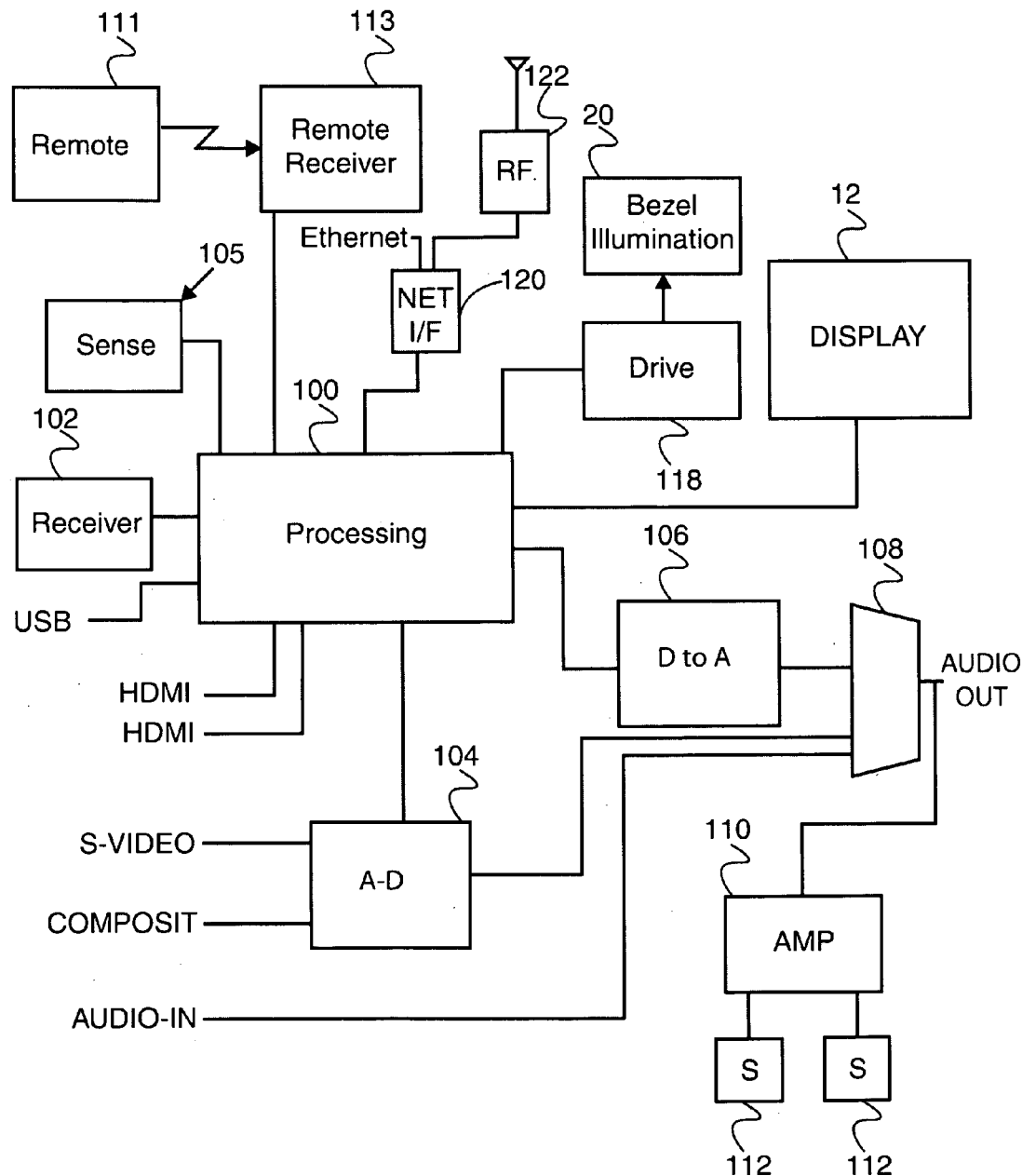
FIG. 5 illustrates a first schematic view of a typical monitor/television of the present invention.

Referring to FIG. 5, a first schematic view of a typical monitor/television of the present invention will be described. This figure is intended as a representative schematic of a typical monitor/television 5 and in practice, some elements are not present in some monitors/televisions 5 and/or additional elements are present in some monitors/televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Inputs (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112/114.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In some embodiments, a light sensor 105 is interfaced to the processing element 100, for example, a photodiode. The light sensor 105 conveys a value representing the ambient light level in the vicinity of the front of the monitor/television 5. This value is used, for example, to vary the brightness of the display 12 and/or the graphic display(s) 20 responsive to the ambient light present in front of the monitor/television 5.

The processing element 100 further controls the bezel illumination 20 through a bezel driver 118. In this, serial or parallel outputs from the processing element 100 interface with a bezel illumination driver 118 which is connected to and controls the bezel illumination 20. It is well known in the industry how to control light emission on devices such as described for the bezel illumination 20 and this is but an example of such. In some embodiments, the functionality of the bezel driver 118 is integrated into the processing element 100. In some embodiments, the drivers 118 are integrated into the bezel illumination 20. Any other known configuration is anticipated and functions within the present invention. It is well known how to control Liquid Crystal Displays (LCD), plasma displays, OLED displays, electronic paper, Light Emitting Diode (LED) arrays, etc. For example, if the bezel illumination 20 comprises an array of LEDS, the bezel driver 118, in one embodiment, the bezel driver 118 uses pulse-width modulation to control the brightness or each group of LEDS (e.g., the wider the pulse width, the brighter that group of LEDS will shine). Alternately, in another embodiment, the bezel driver 118 controls the current flowing through the group of LEDS to control the brightness or each that group.

In some embodiments, the television/monitor 5 is connected to a network, such as the Internet or local area network. In these embodiments, a network interface 120 monitors the network and transfers data back and fourth between the processing element 100 and the network. In some embodiments, the network is a wired network such as an Ethernet network. In other embodiments, the network is wireless such as WiFi/802.11 and a wireless interface 122 is provided.

Figure 5A:
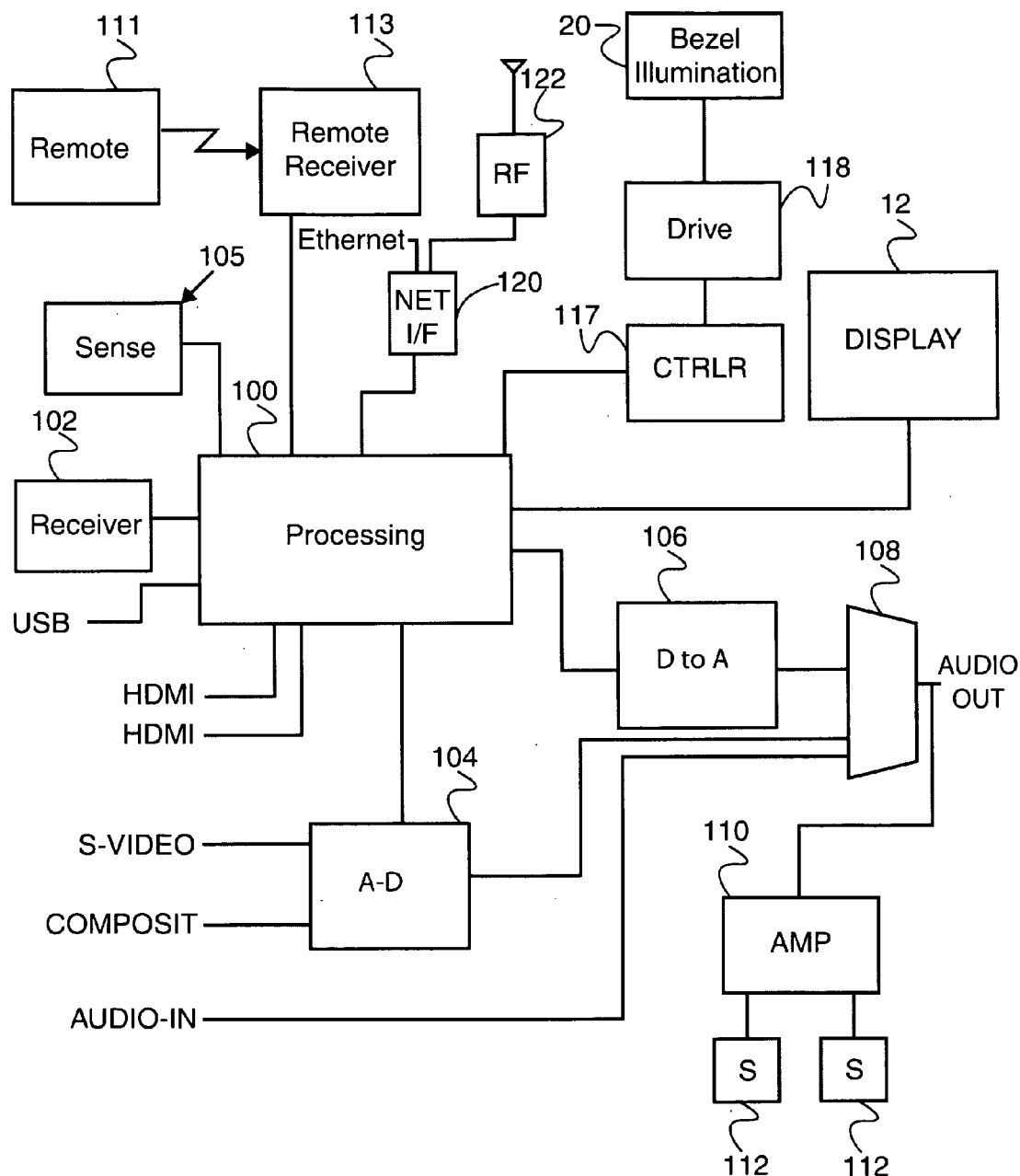
FIG. 5A illustrates a second schematic view of a typical monitor/television of the present invention.

Referring to FIG. 5A, a second schematic view of a typical monitor/television of the present invention will be described. This figure is intended as another representative schematic of a typical monitor/television 5 and in practice, some elements are not present in some monitors/televisions 5 and/or additional elements are present in some monitors/televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Inputs (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112/114.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In some embodiments, a light sensor 105 is interfaced to the processing element 100. The light sensor 105 conveys a value representing the ambient light level in the vicinity of the front of the monitor/television 5.

In this example, the processing element 100 further controls the bezel illumination 20 through a controller 117. The controller 117 interfaces either directly to the bezel illumination 20 or through a bezel driver 118 to the bezel illumination 20. In this, serial (e.g., I2C) or parallel outputs from the processing element 100 interface with the controller 117 which is connected to and controls the bezel illumination 20 either through dedicated drivers 118 or directly (not shown). It is well known in the industry how to control the elements of the bezel illumination 20 and this is but an example of such. In some embodiments, the controller 117, bezel drivers 118 and bezel illumination 20 are powered by auxiliary power (power supplied when the television/monitor 5 is in standby mode). In these embodiments, the controller 117 continues to drive the bezel illumination 20, even when the television/monitor 5 is in auxiliary mode (e.g., appears to be off). In some embodiments, the controller 117 and/or drivers 118 are integrated into the bezel illumination 20. Any other known configuration is anticipated and functions within the present invention. It is well known how to control Liquid Crystal Displays (LCD), plasma displays, OLED displays, electronic paper, Light Emitting Diode (LED) arrays, etc. For example, if the bezel illumination 20 comprises an array of LEDS, the bezel driver 118, in one embodiment, the bezel driver 118 uses pulse-width modulation to control the brightness or each group of LEDS (e.g., the wider the pulse width, the brighter that group of LEDS will shine). Alternately, in another embodiment, the bezel driver 118 controls the current flowing through the group of LEDS to control the brightness or each that group.

In some embodiments, the television/monitor 5 is connected to a network, such as the Internet or local area network. In these embodiments, a network interface 120 monitors the network and transfers data back and fourth between the processing element 100 and the network. In some embodiments, the network is a wired network such as an Ethernet network. In other embodiments, the network is wireless such as WiFi/802.11 and a wireless interface 122 is provided.

Figure 6:
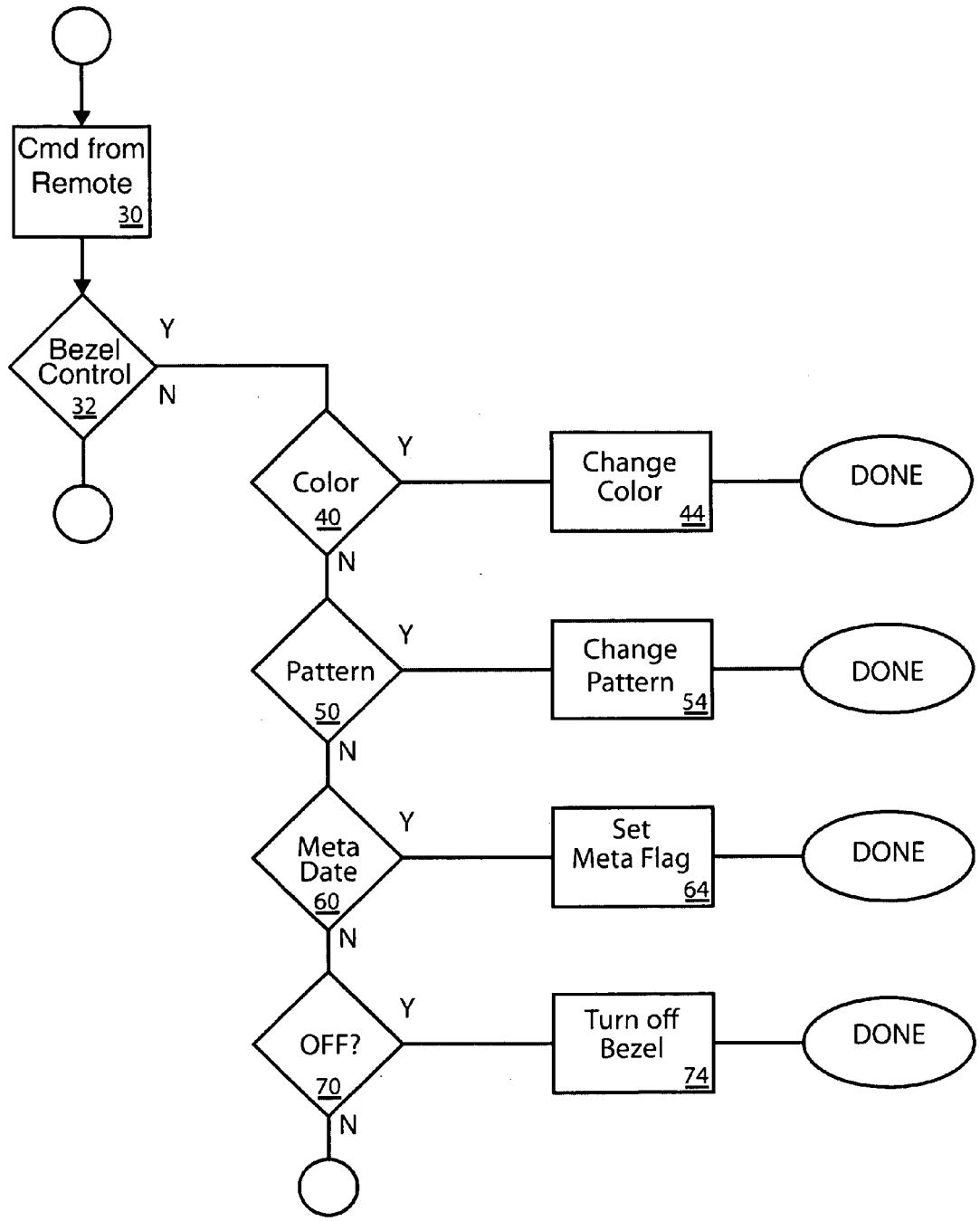
FIG. 6 illustrates a first flow chart of the present invention.

Referring to FIG. 6, a first flow chart of the present invention will be described. This is an exemplary program flow executed within the processing element 100 upon reception of a command 30 from the remote control 111. The command 30 is tested to see if it is a bezel control 32. If not, the existing processing continues as known in the art. If it is, the command 30 is tested to determine if it is a request to change the color 40 of the bezel 10. If it is, in this example, an on screen display is presented to change the color 44. Other methods are also anticipated to effect the color change such as sequencing through a series of colors, etc.

If it isn't a request to change the color 40 of the bezel 10, then the command 30 is tested to determine if it is a request to change the color pattern of the bezel 50. If it is, in this example, an on screen display is presented to change the color pattern 54. Other methods are also anticipated to effect the color change such as sequencing through a series of color patterns, etc.

If it isn't a request to change the color pattern of the bezel 50, then the command is tested to determine if it is a request to turn on meta-data 60. If it is, in this example, a meta-data flag is set 64. The use of this flag is described with FIG. 7.

If it isn't a request to use meta-data 60, then the command 30 is tested to determine if it is a request to turn off the bezel 70. If it is, in this example, the bezel is turned off 74. If it isn't a request to turn off the bezel 70, processing continues.

This is but one example of a program running in the processing element 100 that controls the color and or brightness of the bezel illumination 20. Other methods, either more or less complicated are anticipated for monitoring various internal and external parameters and settings.

Figure 7:
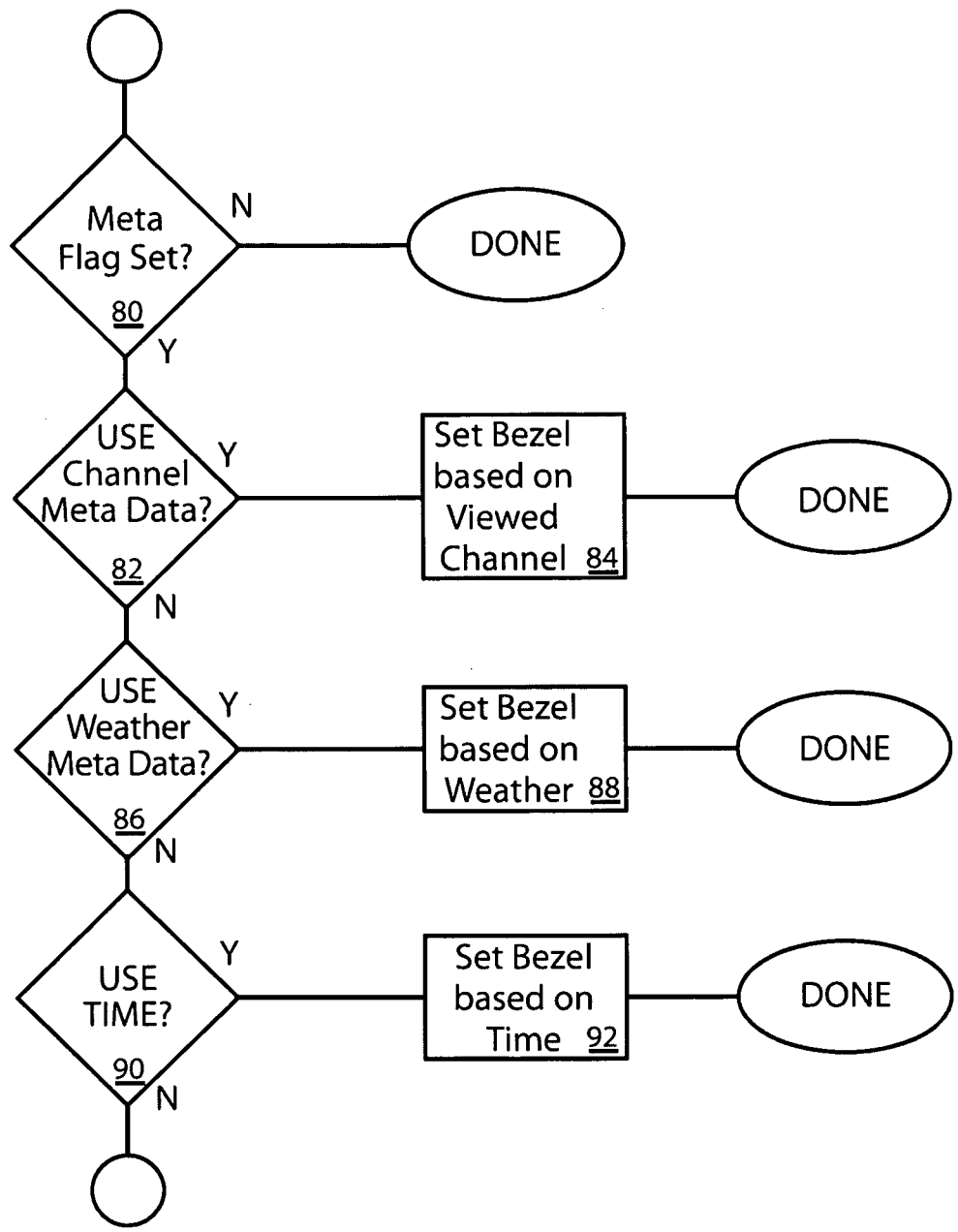
FIG. 7 illustrates a second flow chart of the present invention.

Referring to FIG. 7, a second chart of the present invention will be described. This is an exemplary program flow executed within the processing element 100 periodically (e.g., at fixed intervals or at a particular instance such as during re-trace, etc.). First, the meta-data flag is tested to see if it is enabled 80. If not enabled, the flow is done. If it is enabled 80, the meta-flag is tested to determine which type of meta-data is to be used in controlling the bezel color 80. For example, if the meta-data is set to use the current channel 82, then the color of the bezel 10 is set based on the current channel being used 84. For example, if the Discovery Channel is being watched, then the bezel 10 color is set to a first color (e.g., green) and if the Weather Channel is being watched, the bezel 10 color is set to a second color (e.g., blue). In this way, the viewer has information regarding which channel is being watched by the color of the bezel 10, even when a commercial is playing.

If the meta-data is not set to use the current channel 82, the meta-flag is then tested to determine if the current outside weather is to be used in controlling the bezel color 86. For example, if the meta-data is set to use the weather 86, then the color of the bezel is set based on the current weather 88. For example, if internal data to the processing element 100 indicates that it is sunny, the bezel color is set to a first color (e.g., yellow). If internal data to the processing element 100 indicates that it is rainy, the bezel color is set to a second color (e.g., gray). In this way, the viewer has information regarding the weather while watching their favorite program.

If the meta-data is not set to use the weather 86, the meta-flag is then tested to determine if the current time is to be used in controlling the bezel color 90. For example, if the meta-data is set to use the current time 90, then the color of the bezel is set based on the current time 92. For example, if the current time indicates that it is morning, the bezel color is set to a first color (e.g., yellow). If current time indicates that it is night time, the bezel color is set to a second color (e.g., black or off). In this way, the bezel color varies with the time.

Many types of dynamic and static data are anticipated to be used to control the bezel illumination 20, including but not limited to, stock market, holidays, voicemail waiting, recording indication, favorite show starting, approach of a tornado or other storm, incoming messages, etc.

Figure 8:
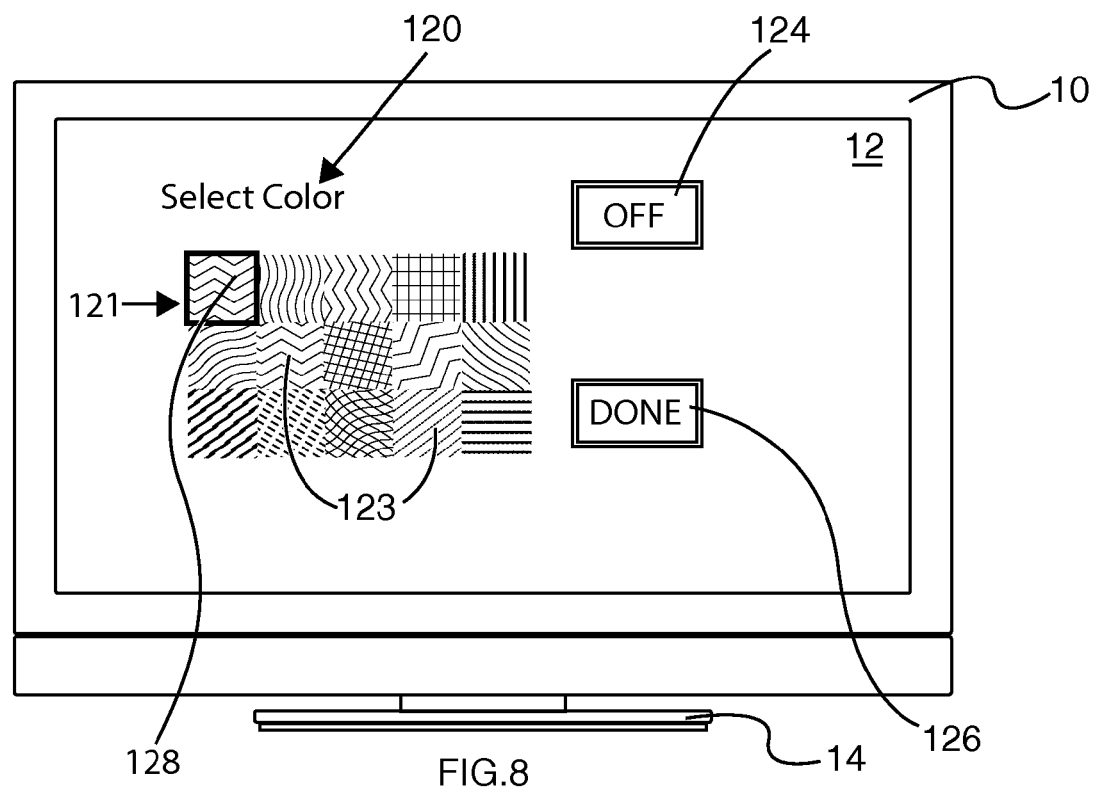
FIG. 8 illustrates a plan view of a first typical on-screen display of the present invention.

Referring to FIG. 8, a plan view of a first typical on-screen display of the present invention will be described. Many user interfaces are known in the industry and the color selection user interface of FIG. 8 is but one example. In this, the user is presented with a heading "Select Color" 120 along with a grid of possible colors 121. In the grid of possible colors 121 are multiple color choices 123, one of which is highlighted 122. Using an input device, such as a television remote control, the user/viewer maneuvers the highlighting 122 to the color choice desired, and then selects the "DONE" feature 126. Responsive to the "DONE" feature 126 being activated, the bezel is changed to the selected color. If, instead, the user/viewer wishes to turn off the bezel color, the user/viewer selects the "OFF" feature 124 and the bezel illumination is turned off.

Figure 9:
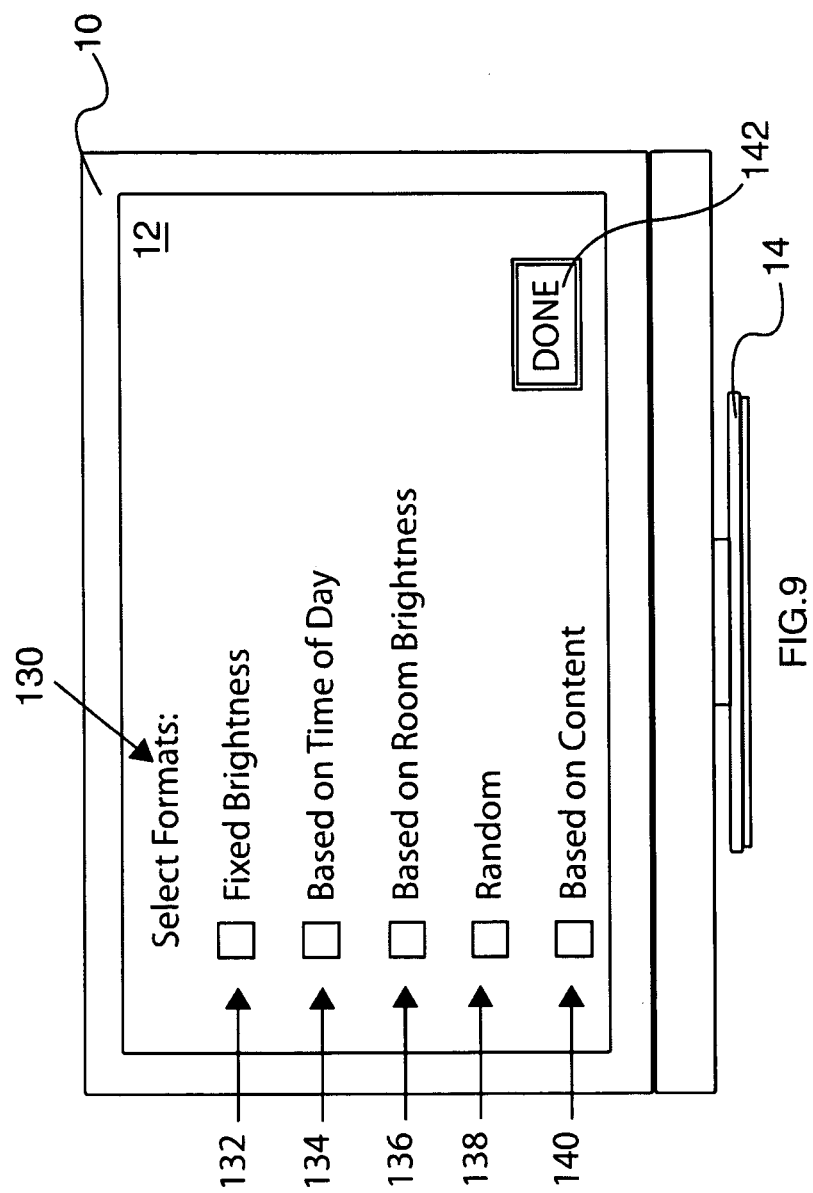
FIG. 9 illustrates a plan view of a second typical on-screen display of the present invention.

Referring to FIG. 9, a plan view of a second typical on-screen display of the present invention will be described. Many user interfaces are known in the industry and the meta-data selection user interface of FIG. 9 is but one example. In this, the user is presented with a heading "Select Format:" 130 along with several choices 132/134/136/138/140. The user/viewer maneuvers to the desired choice 132/134/136/138/140 using an input device such as the arrows on a television remote control 111. Once at the desired choice 132/134/136/138/140, the user/viewer selects that choice using, perhaps, the select key, then selects the "DONE" feature 142, whereby the processing element 100 sets up the bezel illumination accordingly. For example, if "Fixed Brightness" 132 is selected, the bezel is set to a static level of brightness. If "Based on Time of Day" 134 is selected, the brightness is varied based upon an internal algorithm based upon the time-of-day. If "Based on Room Brightness" 136 is selected, the brightness of the bezel is varied responsive to the ambient light in front of the monitor/television 5. If "Random" 138 is selected, the brightness is randomly set. If "Based on Content" 140 is selected, the brightness and color of the bezel is set by an algorithm that evaluates the predominant colors in the current image. Such algorithms are known. For example, a histogram of colors is used to determine the most prevalent color being displayed.

Many types of dynamic and static data are anticipated to be used to control the bezel illumination 20, including but not limited to, stock market, holidays, voicemail waiting, recording indication, favorite show starting, approach of a tornado or other storm, incoming messages, etc. The data that is portrayed on the bezel display 20 includes information, events, notifications, content data. The data or meta data is held or derived from within the television/monitor (e.g., current channel) or information from external sources such as the Internet, other devices, phone system, etc. Information includes data such as date, time etc. Events include data such as phone ringing, incoming message, etc). Notifications include data such as a favorite show is currently being received, new voicemail, etc. Content data includes data such as channel, show, etc. The data may come from within the TV, over a local area network, over a wide area network (e.g., Internet) or over a connection to a device that is connected to the television/monitor 5.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A bezel lighting system mounted on a monitor/television, the bezel lighting system comprising:
    a bezel mounted on a periphery of a face of the monitor/television, the bezel surrounding a display panel, the bezel made of a material, the material transmitting light from within the bezel to outside of the bezel; and
    at least one illuminating element situated behind the bezel, the at least one illuminating element situated such that when any of the at least one illuminating elements is energized to emit the light, at least some of the light passes through the bezel;
    a processing element, controlling the emit of the light by the at least one illuminating element, wherein the at least one illuminating element illuminates in an overall color, and the processing element changes the overall color based on a parameter obtained by the processing element, where the parameter relates to an action outside the monitor/television.

2. The bezel lighting system of claim 1, wherein each of the at least one illuminating element is selected from the group consisting of a light emitting diode, a florescent lamp, an incandescent lamp and an organic light emitting diode.

3. The bezel lighting system of claim 1, wherein the at least one illuminating element has at least two sets of the illuminating elements and each of the at least two sets of the illuminating elements emit a different color of light than the other of the at least two sets of illuminating elements.

4. The bezel lighting system of claim 3, wherein the processing element also controls a brightness of each of the at least two sets of the illuminating elements.

5. The bezel lighting system of claim 4, wherein the processing element changes the overall color of the bezel based on a channel that is currently being viewed, such that a first channel creates a first color bezel and a second channel creates a second color bezel.

6. The bezel lighting system of claim 4, wherein the processing element changes the overall color of the bezel based on a current outdoor weather, such that a first current weather creates a first color for the bezel and a second current weather creates a second color for the bezel.

7. The bezel lighting system of claim 1, further comprising a light diffuser situated between the at least one illuminating element and an inner surface of the bezel.

8. A method of controlling a bezel lighting system, the method comprising:
   providing the bezel lighting system mounted on a monitor/television, the bezel lighting system comprising:
      a bezel mounted on a periphery of a face of the monitor/television, the bezel surrounding a display panel, the bezel made of a material, the material transmitting light from within the bezel to outside of the bezel; and
      at least one illuminating element situated behind the bezel, the at least one illuminating element situated such that when any of the at least one illuminating elements is energized to emit the light, at least some of the light passes through the bezel;
   controlling each of the at least one illuminating elements with a processing element;
   displaying an on-screen display by the processing element responsive to an input device;
   selecting a bezel lighting option from the on-screen display by a user;
   responsive to the bezel lighting option, controlling a brightness of each illuminating element by the processing element of the at least one illuminating elements; and
   taking off the on-screen display by the processing element, wherein the at least one illuminating element illuminates in an overall color, and the processing element changes the color based on a parameter obtained by the processing element, where the parameter relates to an action outside the monitor/television.

9. The method of claim 8, wherein each of the at least one illuminating element is selected from the group consisting of a light emitting diode, a florescent lamp, an incandescent lamp and an organic light emitting diode.

10. The method of claim 8, wherein the at least one illuminating element consists of at least two sets of the illuminating elements and each of the at least two sets of the illuminating elements emit a different wavelength of light than the other of the at least two sets of illuminating elements.

11. The method of claim 10, wherein the step of controlling the brightness of each illuminating element includes independently controlling the brightness of each of the at least two sets of the illuminating elements by the processing element.

12. The method of claim 8, further comprising changing the color of the bezel based on a channel that is currently being viewed, such that a first channel creates a first color bezel and a second channel creates a second color bezel.

13. The method of claim 8, further comprising changes the color of the bezel based on a current outdoor weather, such that a first current weather creates a first color bezel and a second current weather creates a second color bezel.

14. An illuminated bezel mounted on a periphery of a face of a monitor/television, the illuminated bezel made of a material, the material transmitting light from within the illuminated bezel to outside of the illuminated bezel, the illuminated bezel comprising:
   at least one illuminating element situated behind the illuminated bezel, the at least one illuminating element situated such that when any of the at least one illuminating elements are energized to emit light, at least some of the light passes through the illuminated bezel,
   a diffuser that diffuses light from the multiple different illuminating elements together with one another; and
   a processor that controls a color of the light that passes through the diffuser based on a parameter determined by the processor that is outside of the monitor/television.

15. The illuminated bezel of claim 14, wherein the material forms the diffuser.

16. The illuminated bezel of claim 14, wherein the diffuser situated between the at least one illuminating element and an inner surface of the illuminated bezel.

* * * * *